United States Patent [19]

Thomas

[11] Patent Number: 5,672,101
[45] Date of Patent: Sep. 30, 1997

[54] SOLAR OPERATED VENT COVER

[76] Inventor: Allen C. Thomas, 4510 W. Alva, Tampa, Fla. 33614

[21] Appl. No.: 355,439

[22] Filed: Dec. 13, 1994

Related U.S. Application Data

[63] Continuation of Ser. No. 11,132, Jan. 29, 1993, which is a continuation-in-part of Ser. No. 877,732, May 4, 1992, abandoned, which is a continuation-in-part of Ser. No. 659,937, Feb. 25, 1991, Pat. No. Des. 330,415.

[51] Int. Cl.$^6$ ............................................. B60J 7/08
[52] U.S. Cl. ............................................. 454/136; 454/94
[58] Field of Search ...................... 454/136, 94, 900

[56] References Cited

U.S. PATENT DOCUMENTS

| | | | |
|---|---|---|---|
| 3,303,769 | 2/1967 | Williams | 454/94 |
| 3,472,147 | 10/1969 | Grasseler | 454/136 |
| 3,738,621 | 6/1973 | Anderson | 261/29 |
| 4,048,910 | 9/1977 | Weir | 454/136 |
| 4,759,270 | 7/1988 | Lindeen | 454/94 |
| 4,800,803 | 1/1989 | Farmont | 454/136 |
| 5,038,674 | 8/1991 | Merges | 454/900 |
| 5,156,568 | 10/1992 | Ricci | 454/900 |

FOREIGN PATENT DOCUMENTS

| | | | |
|---|---|---|---|
| 3316823 | 11/1984 | Germany | 454/900 |
| 5938109 | 3/1984 | Japan | 454/136 |

*Primary Examiner*—William Doerrler
*Attorney, Agent, or Firm*—Frijouf, Rust & Pyle, P.A.

[57] ABSTRACT

An improved solar operated ventilator cover is disclosed for covering an aperture disposed in a horizontal surface. The cover has sidewalls with a cover opening and a top surface with an internal wall extending between the sidewalls and the top wall. An orifice is defined in the internal wall for enabling the flow of air within the cover. An electric motor has a motor shaft with a fan blade positioned proximate the orifice. A photovoltaic cell is connected to the electric motor for rotating the fan blade proximate the orifice to establish the flow of air through the cover opening.

7 Claims, 11 Drawing Sheets

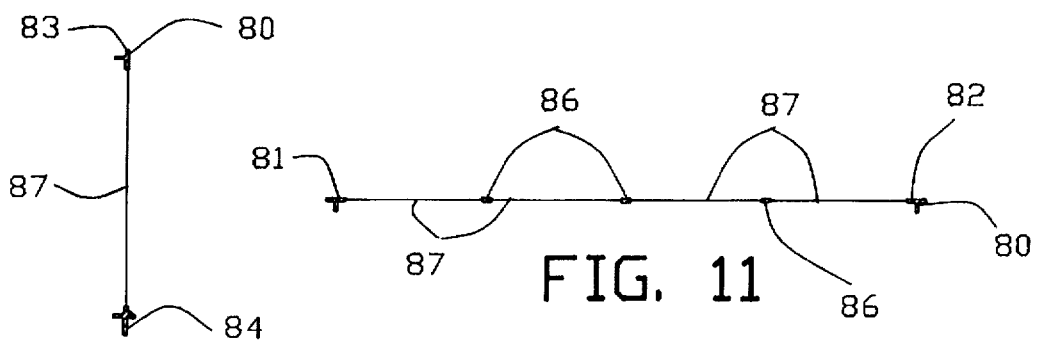
FIG. 10
FIG. 11
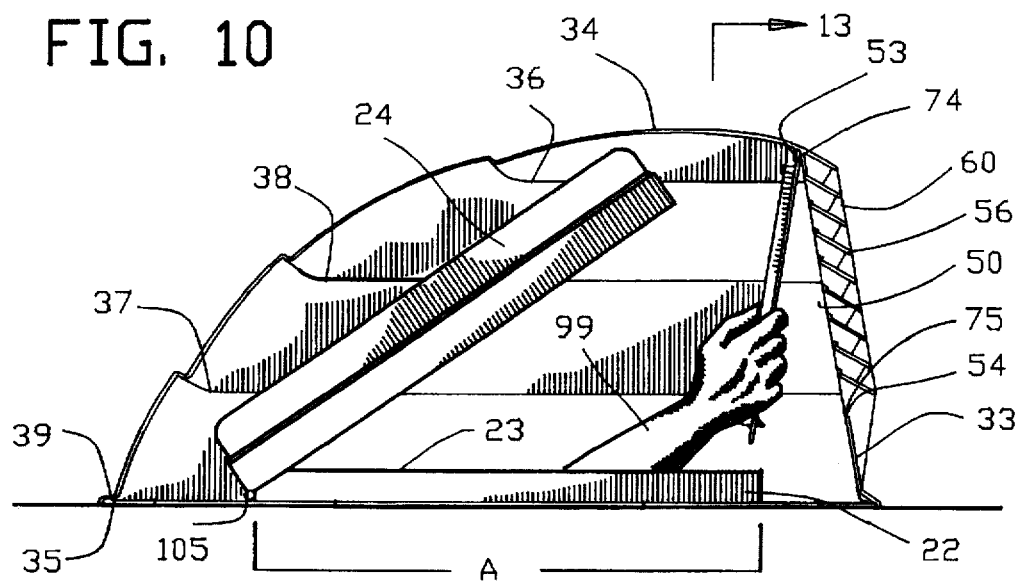
FIG. 12
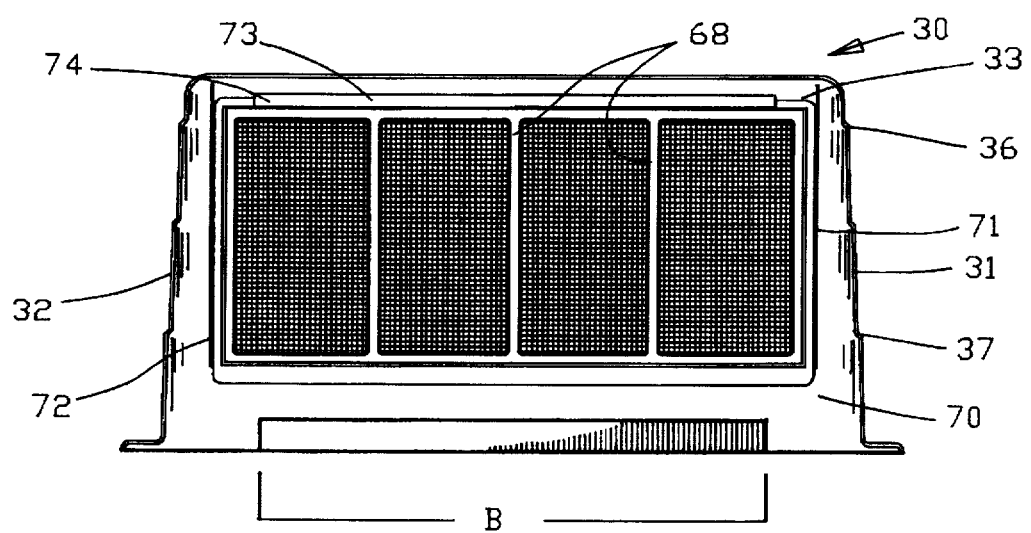
FIG. 13

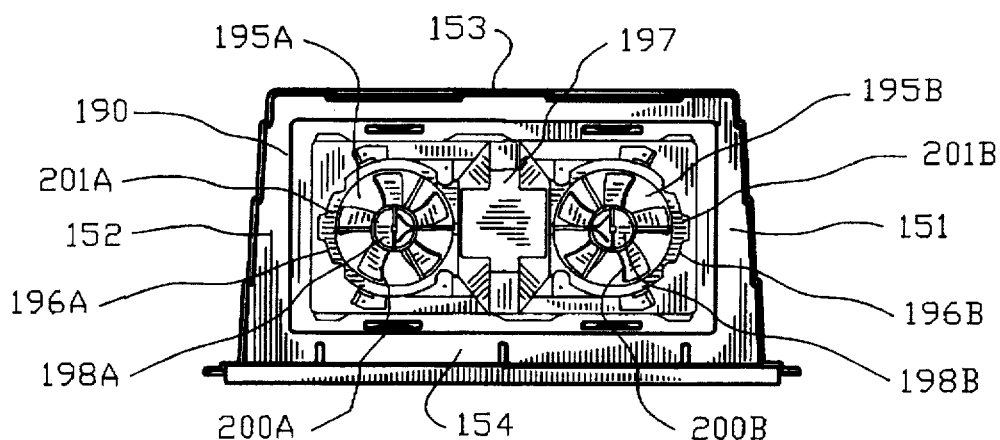
FIG. 25
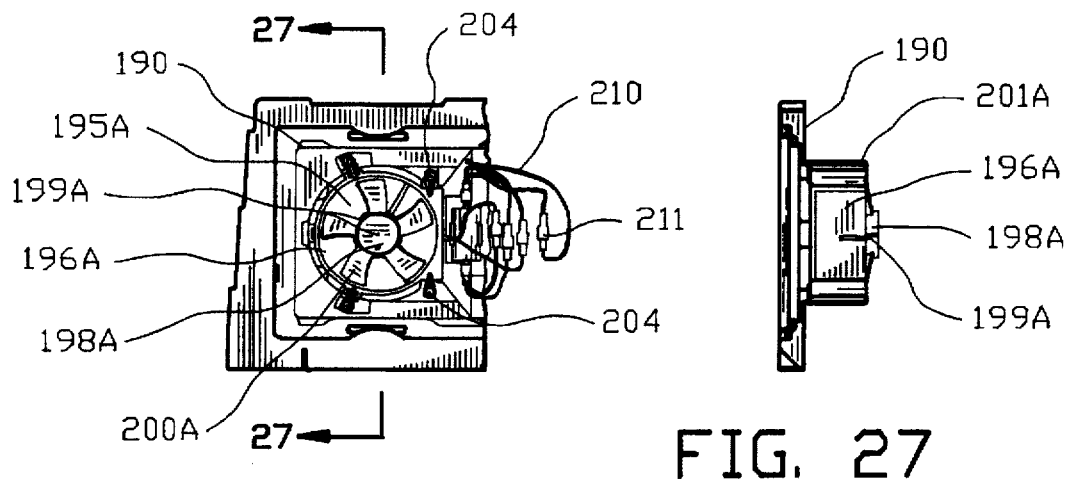
FIG. 26
FIG. 27
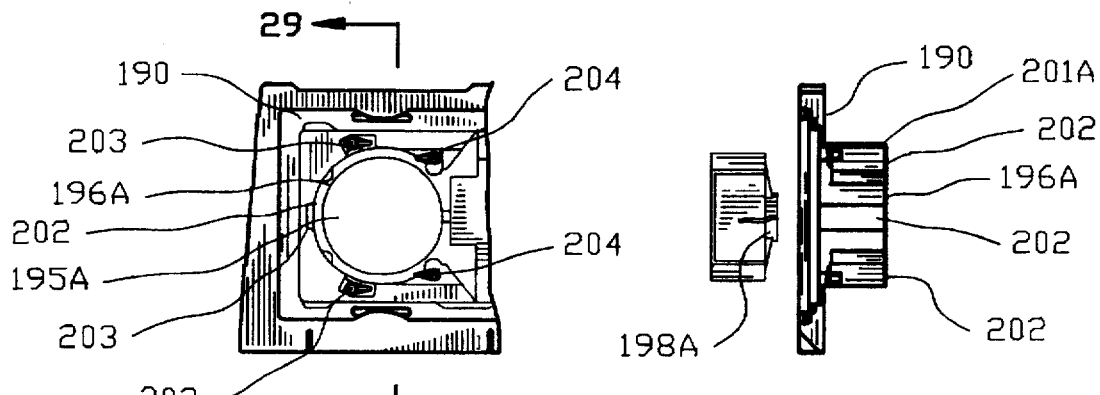
FIG. 28
FIG. 29

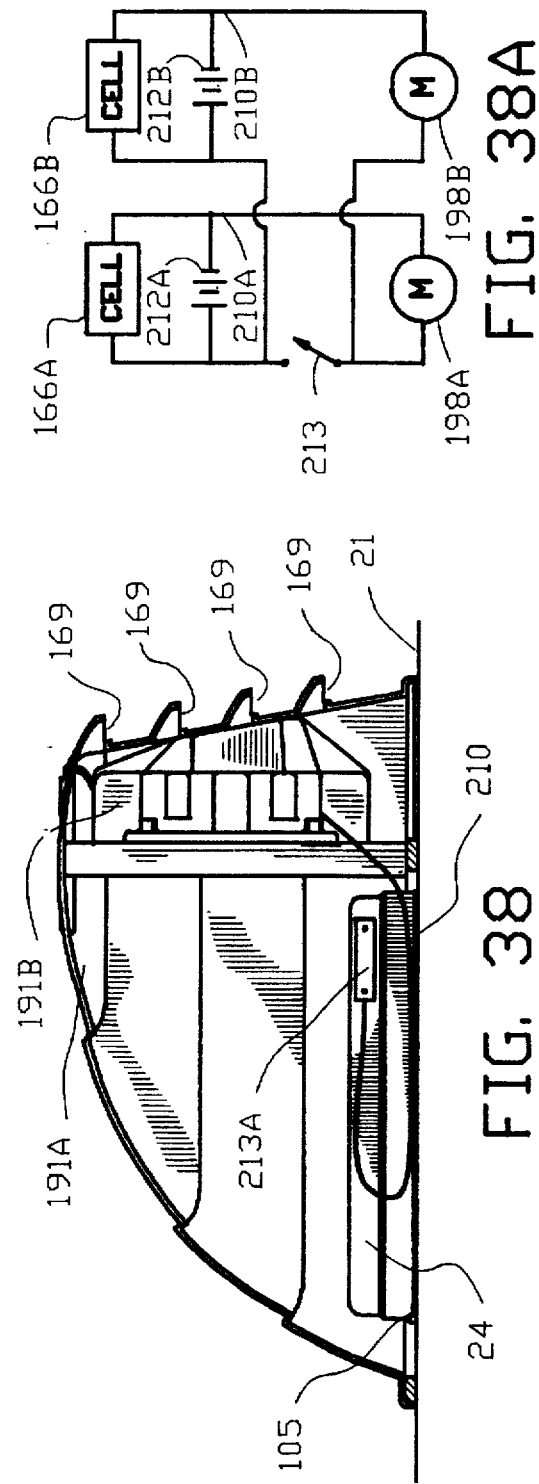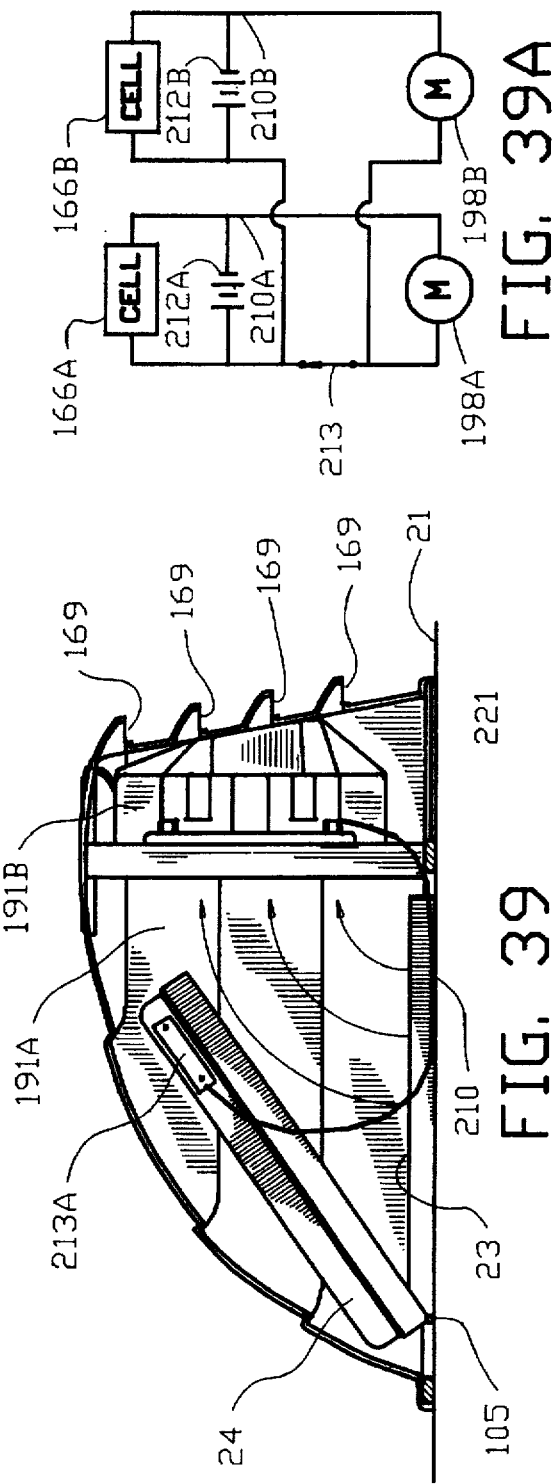

SOLAR OPERATED VENT COVER

CROSS-REFERENCE TO RELATED APPLICATIONS

This application is a continuation of application Ser. No. 08/011,132 filed Jan. 29, 1993, the disclosure of which is incorporated herein by reference, which is a continuation-in-part of application Ser. No. 877,732 filed May 4, 1992, now abandoned. Application Ser. No. 877,732 filed May 4, 1992 is a continuation-in-part of application Ser. No. 659,937 filed Feb. 25, 1991, now U.S. Pat. No. D. 330,415. All subject matter set forth in application Ser. Nos. 659,937 and 877,732 are hereby incorporated into the present application.

BACKGROUND OF THE INVENTION

1. Field of the Invention

This invention relates to a device for covering an aperture on a horizontal surface, and more specifically relates to a solar powered ventilator cover for covering an air vent on a motor home or similar vehicle.

2. Information Disclosure Statement

Recreational and other vehicles contain air vent openings to facilitate the entry of fresh air into the vehicle. These openings are typically located on a top horizontal surface of the vehicle and have air vent caps overlying the air vent openings. The air vent caps generally pivot about a hinge on the front of the air vent cap to open toward the rear of the vehicle for venting the vehicle. The air vent cap allows for the entry of fresh air into the vehicle and allows for the escape of gases from the vehicle. Unfortunately, these air vent openings also allow for the entry into the vehicle of liquid and solid matter along with the fresh air. To overcome this problem, the prior art developed air vent covers for mounting over the air vent opening and the air vent cap to obstruct the flow of liquids and solids while allowing the flow of fresh air and gases between the outside and the interior of the vehicle.

The prior art discloses a variety of air vent cover improvements. In general, the prior art vent covers had sidewalls for supporting a top to provide sufficient clearance for the air vent cap to pivot into an open position. The top was frequently tapered toward the front to provide for a more aerodynamic surface. A grill was typically mounted in a rearward facing sidewall with the grill having louvers to deflect foreign matter such as rain from entering the interior of the air vent cover. A screen was secured to cover the grill to prevent small foreign objects such as insects, dust and the like from entering the interior of the air vent cover. The air vent cover was often of a one-piece construction being molded from plastic or other durable and weather resistant materials. The air vent cover was affixed to the roof of the vehicle by mechanical means such as a bracket molded into the air vent cover.

These air vent covers greatly enhanced the art of providing protection of the air vent for the interior of the vehicle from outside elements. However, the air vent covers of the prior art suffer from various shortcomings. The screen secured to the grill of the air vent cover was one of the more fragile components of the air vent cover thus requiring periodic maintenance. After the screen became dirty because of screen-sized particulate matter and insects striking and becoming lodged in the screen, it was necessary to periodically clean and repair the screen.

Repairing the screen in place involved climbing on top of the vehicle and making repairs in an inconvenient position. Moreover, since the screen was internal to the air vent cover, the grill substantially obscured the screen making the cleaning of the screen from the outside difficult or impossible. The grill inhibited the scrubbing or brushing of the screen from the outside. Also, spraying the screen with a hose from the outside is less effective than from the inside, since most of the particles were normally lodged on the outside of the screen.

Therefore the repair or cleaning of the screen was not a convenient task. A person must climb on top of the vehicle and the entire cover had to be removed in order to work on the screen. During such removal, the air vent opening was exposed to the environment. In addition, the use of tools was normally required to complete the task. Another shortcoming of the prior art air vent cover was the failure to effectively prevent precipitation from being driven through the grill into the air vent and thus into the vehicle.

In my prior invention set forth in U.S. patent application Ser. No. 877,732 filed May 4, 1992, I disclosed a device for covering an air vent on a vehicle comprising a screen which can be removed without the need for climbing on top of the vehicle.

Others in the prior art have attempted to incorporate motor driven fans in various assorted ventilators for facilitating the flow of air therethrough. U.S. Pat. No. 4,432,273 to Devitt disclosed a roof vent for a flat built-up roof having a truncated pyramid-shaped air stack with a protective cap and an internal fan for inducing upward air flow through a check valve at the upper end of the stack. A solar panel provided power for operating the fan with a thermal switch being employed for enabling the fan above an ambient temperature of 50 degrees F. A humidistat was employed for disabling the fan below 50% relative humidity.

U.S. Pat. No. 4,800,803 to Farmont disclosed a ventilation device for a vehicle roof window disposed in a window opening having a light-permeable cover. The cover was adjustably movable between at least one open and one closed position. The ventilation device consisted of a motor-driven fan and a support for fastening on a vehicle body with the fan being on the vehicle interior side of the cover within the window opening. A solar cell power source was provided for the fan motor and being arranged between the light-permeable cover and the support.

U.S. Pat. No. 5,003,866 to Ricci disclosed a ventilator having a housing with first and second openings is mounted on structure of a vehicle and communicates directly with the vehicle cabin to move air between the vehicle cabin ad the outside environment. The ventilator was secured onto the vehicle structure and had a powered impeller to positively move air between the external environment and the vehicle cabin which impeller may be powered by a self-contained power supply connected with a charging source such as a photovoltaic panel and/or the electrical system of the vehicle.

U.S. Pat. No. 5,038,674 to Merges disclosed an arrangement for ventilating the passenger compartment of a motor vehicle having a hinged roof cover, an electric fans as well as a solar module integrated into the roof cover. The fans were constructed as axial-flow fans and were arranged in the area below the rear transverse edge of the roof cover. The solar module covered the roof cover and was constructed by the semiconductor thin-film technique.

U.S. Pat. No. 5,131,88 to Adkins disclosed a solar powered exhaust fan having a pipe adaptor for connection to the interior of portable buildings. The exhaust fan was either DC or AC energized by automatic or manual switches.

It is a primary object of the present invention to improve upon my prior invention by providing an improved solar powered ventilator cover for covering an air vent on a motor home or a similar vehicle.

Another object of this invention is to provide an improved solar powered ventilator cover incorporating a motor driven fan for ventilating a motor home or a similar vehicle.

Another object of this invention is to provide an improved solar powered ventilator cover incorporating a motor driven fan that can operate continuously without draining the battery of the motor home or a similar vehicle.

Another object of this invention is to provide an improved solar powered ventilator cover incorporating a motor driven fan that operates independent of the electrical system of the motor home or a similar vehicle.

Another object of this invention is to provide an improved solar powered ventilator cover incorporating a motor driven fan that operates in the absence of solar irradiation.

Another object of this invention is to provide an improved solar powered ventilator cover incorporating a motor driven fan that can be installed on a motor home or a similar vehicle with any electrical installation.

Another object of this invention is to provide an improved solar powered ventilator cover incorporating a motor driven fan that readily replaces existing prior art vent covers on a motor home or a similar vehicle.

Another object of this invention is to provide an improved solar powered ventilator cover incorporating a motor driven fan that can ventilate a motor home or a similar vehicle during precipitation.

Another object of this invention is to provide an improved solar powered ventilator cover incorporating a motor driven fan that can be replaced easily and inexpensively.

Another object of this invention is to provide an improved solar powered ventilator cover incorporating a motor driven fan that operates only when the vent cap is open.

Another object of this invention is to provide an improved solar powered ventilator cover incorporating multiple motor driven fans to allow for high volumetric air flow within limited height restrictions of a vent cover.

Another object of this invention is to provide an improved solar powered ventilator cover incorporating a motor driven fan which utilized screens which are easily removed.

Another object of this invention is to provide an improved solar powered ventilator cover incorporating a motor driven fan having an internal wall and utilizing one-piece assembly.

Another object of this invention is to provide an improved solar powered ventilator cover incorporating a disconnect switch for preventing the powering of the electric motor when the aperture disposed in the horizontal surface is obstructed.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with a specific embodiment being shown in the attached drawings. For the purpose of summarizing the invention, the invention relates to an improved solar operated ventilator cover for covering an aperture disposed in a horizontal surface. The cover has sidewall means and a top surface with a cover opening defined within the sidewall means. The cover is affixed to the horizontal surface. The improvement comprises an internal wall extending between the sidewall means and the top wall for defining a first chamber and a second chamber with the first chamber being disposed adjacent the cover opening. An orifice is defined in the internal wall for enabling the flow of air between the first and the second chambers. An electric motor has a motor shaft with a fan blade secured thereto. The electric motor is secured relative to the orifice for positioning the fan blade proximate the orifice. A photovoltaic cell is secured to the top surface of the cover for converting solar irradiation into electrical power. Electrical connecting means connects the photovoltaic cell to the electric motor for rotating the fan blade proximate the orifice to establish the flow of air between the first and second chambers.

In a more specific embodiment of the invention, the internal wall forms a seal with the horizontal surface for directing all air flow between the first and second chambers through the orifice. Preferably, fastener means secure the internal wall to the sidewall means.

In one embodiment of the invention, the internal wall includes a cylindrical tunnel extending from the orifice with the electric motor and the fan blade being located within the cylindrical tunnel.

Preferably, the internal wall includes a first and a second internal wall surface adjacent the first and second chambers, respectively. A respite is defined in the second internal wall surface of the internal wall for removably receiving a frame having a screened window for overlying the cylindrical tunnel between the first and second chambers.

In one embodiment of the invention, the electrical connecting means comprises a rechargeable battery connected in electrical parallel with the photovoltaic cell enabling the photovoltaic cell to power the electric motor and to simultaneously charge the rechargeable battery during impingement of solar irradiation upon the photovoltaic cell. The rechargeable battery powers the electric motor during non-impingement of solar irradiation upon the photovoltaic cell.

In the alternative, the electrical connecting means comprises a disconnect switch for preventing the photovoltaic cell from powering the electric motor during impingement of solar irradiation upon the photovoltaic cell and when the aperture disposed in the horizontal surface is obstructed.

The cover may incorporate plural orifice and plural cylindrical tunnels for receiving plural electric motors and fan blades with a housing defined between the plural cylindrical tunnels for receiving the electrical connecting means.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 10 is a sectional view along line 10—10 in FIG. 9;

FIG. 11 is a sectional view along line 11—11 in FIG. 9;

FIG. 12 is a sectional view similar to FIG. 5 with the air vent cover mounted on the horizontal surface illustrating the frame and screen being mounted on the air vent cover;

FIG. 13 is a sectional view along line 13—13 in FIG. 12 illustrating the frame and screen being brought into position between guide rails;

FIG. 25 is a sectional view along line 25—25 in FIG. 23;

FIG. 26 is an enlarged view of a portion FIG. 25 with an electric motor secured in position;

FIG. 27 is a sectional view along line 27—27 in FIG. 26;

FIG. 28 is an enlarged view of a portion FIG. 25 with the electric motor being removed;

FIG. 29 is a sectional view along line 29—29 in FIG. 28;

FIG. 38 is a sectional view similar to FIG. 23 with the solar operated ventilator cover mounted on the horizontal surface illustrating a disconnect switch mounted on a vent cap with vent cap being in a closed position;

FIG. 38A is a schematic electrical diagram of a second electrical circuit for use in the solar operated ventilator cover when the vent cap is in the closed position as shown in FIG. 38;

FIG. 39 is a sectional view similar to FIG. 23 with the solar operated ventilator cover mounted on the horizontal surface illustrating the disconnect switch mounted on the vent cap with vent cap being in an open position; and FIG. 39A is a schematic electrical diagram of the second electrical circuit in the solar operated ventilator cover when the vent cap is in the open position as shown in FIG. 39.

Similar reference characters refer to similar parts throughout the several Figures of the drawings.

DETAILED DISCUSSION

Figure 1:
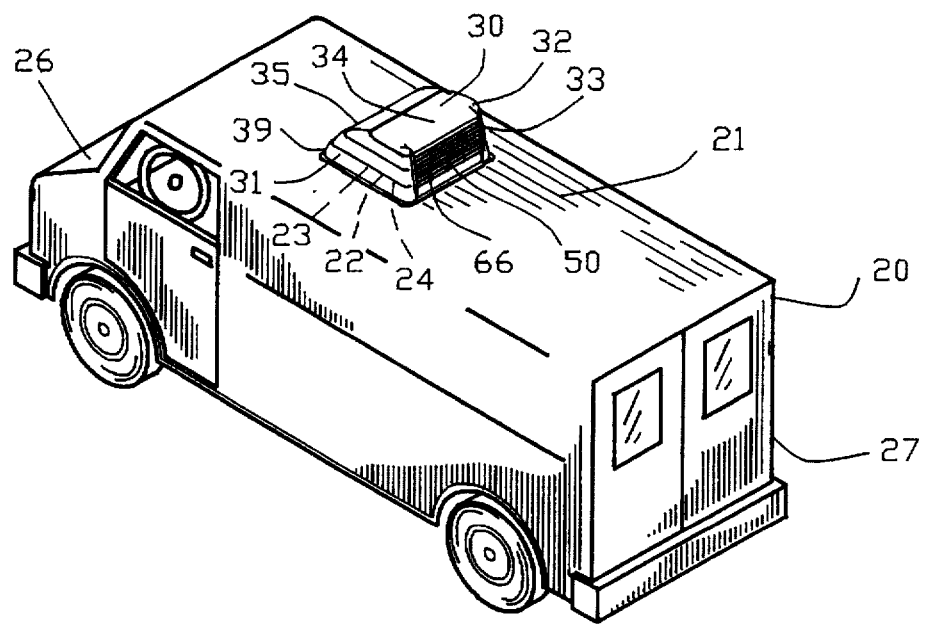
FIG. 1 is an isometric view of an air vent cover of the present invention disposed upon a vehicle.
Figure 2:
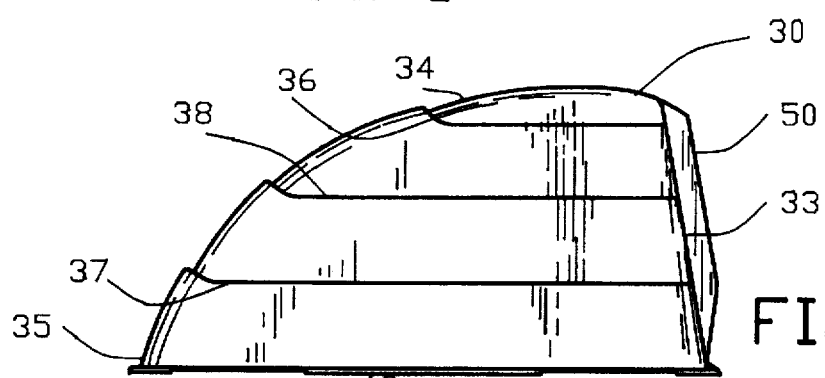
FIG. 2 is a side view of the air vent cover of FIG. 1.
Figure 3:
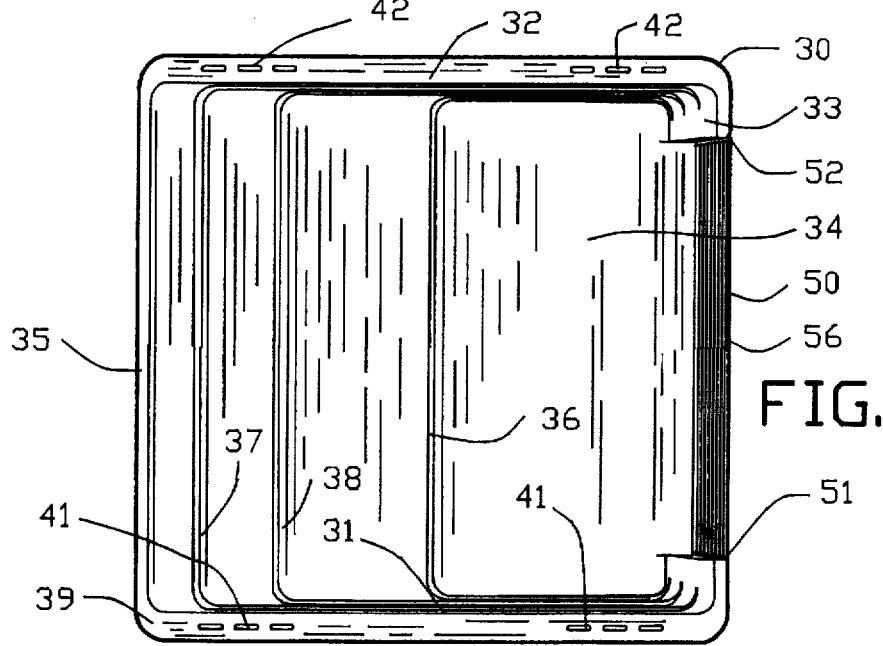
FIG. 3 is a top view of FIG. 2.
Figure 4:
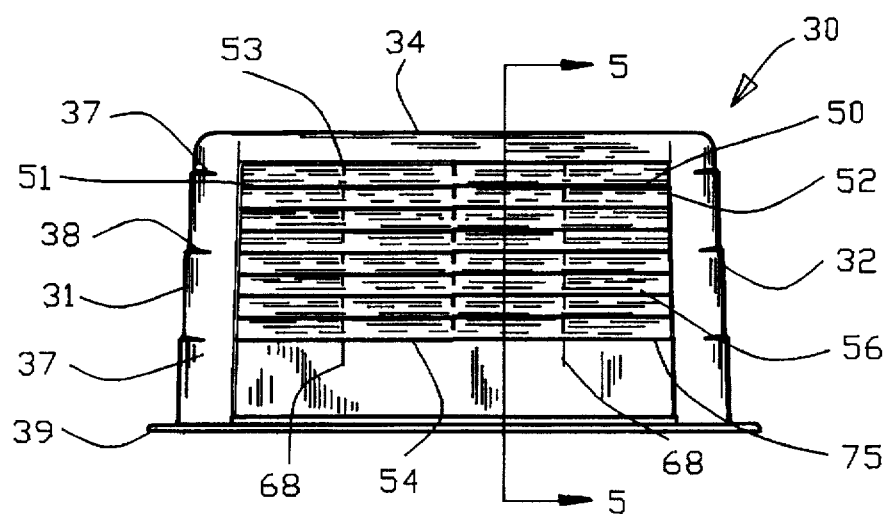
FIG. 4 is a rear view of FIG. 2.
Figure 5:
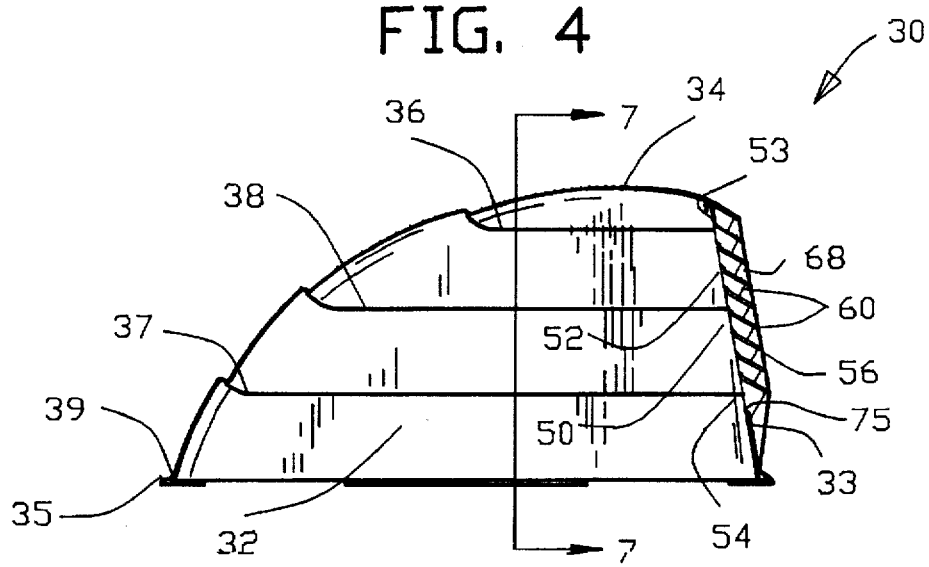
FIG. 5 is a sectional view along line 5—5 of FIG. 4.

FIG. 1 is an isometric view of a recreational vehicle 20 having a horizontal top surface shown as a roof 21. A skylight is mounted 22 in the roof 21 of the vehicle 20 for defining an aperture 23 for use as an air vent for the vehicle 20. As will be shown in greater detail hereinafter, an air vent cap 24 covers the aperture 23. The vehicle 20 comprises a front end 26 and a rear end 27 in a conventional fashion. An air vent cover 30 is mounted on the vehicle 20 to cover the aperture 23 and the air vent cap 24. The air vent cover 30 can similarly be mounted on a van, mobile home or other type of vehicle (not shown).

FIGS. 2–7 illustrate the air vent cover 30 in greater detail comprising sidewall means, shown as a first sidewall 31, a second sidewall 32, and a rear sidewall 33 which provide support for a top surface 34. Preferably, the air vent cover 30 is molded as a single unit and is preferably constructed of plastic or other weather resistant material. The first and second sidewalls 31 and 32 are substantially vertical relative to the roof 21. The rear sidewall 33 is angled toward the rear end 27. The top surface 34 is tapered from the rear sidewall 33 to a leading edge 35 of air vent cover 30. Top and bottom horizontal ridges 36 and 37 run horizontally about the air vent cover 30 for added structural strength. An intermediate ridge 38 further increases structural strength. The air vent cover 30 is affixed to roof 21 by means shown as a base projection 39 having holes 41 and 42.

As shown in FIG. 1, the air vent cover 30 is mounted relative to the vehicle 20 such that the rear sidewall 33 is aligned toward the rear end 27 of the vehicle 20, and the leading edge 35 of the air vent cover 30 is aligned toward the front end 26 of the vehicle 20. Conventional bolts (not shown) are inserted through the holes 41 and 42 in the base projection 39 to secure the air vent cover 30 to the roof 21 of the vehicle 20.

Figure 6:
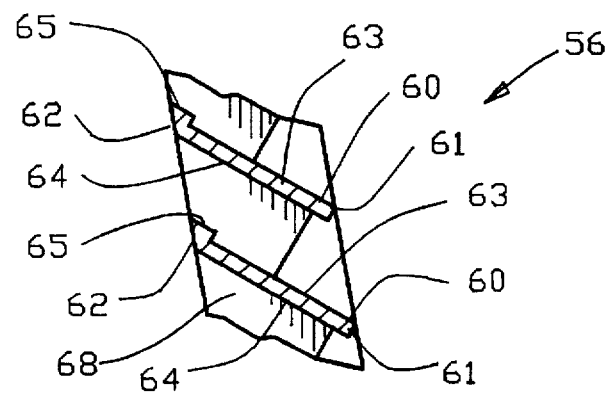
FIG. 6 is an enlarged view of a portion of FIG. 5.

The rear sidewall 33 includes a cover opening 50 having a first through fourth side 51–54. The cover opening 50 is covered by a grill 56 having a plurality of louver blades 60. As best shown in FIG. 6, each of the louver blades 60 has an external edge 61, an internal edge 62, a top surface 63, and a bottom surface 64. Each of the louver blades 60 is mounted downward at an acute angle from the horizontal with the external edge 61 being closer to the roof 21 than the internal edge 62. A water stop 65 is molded on the top surface 63 near the internal edge 62 of each of the louver blades 60. The plurality of louver blades 60 are mounted in a horizontal orientation and are supported by vertical ribs 68.

Wind-driven precipitation will contact and adhere to the top surface 63 of the louver blade 60 and will be driven back and upwardly along the top surface 63 of the louver blade 60 from the external edge 61 toward the internal edge 62. The precipitation is inhibited from further backward movement when the water stop 65 is encountered. Rain is thereby inhibited from entering the interior of the air vent cover 30 or into the vehicle 20.

Figure 7:
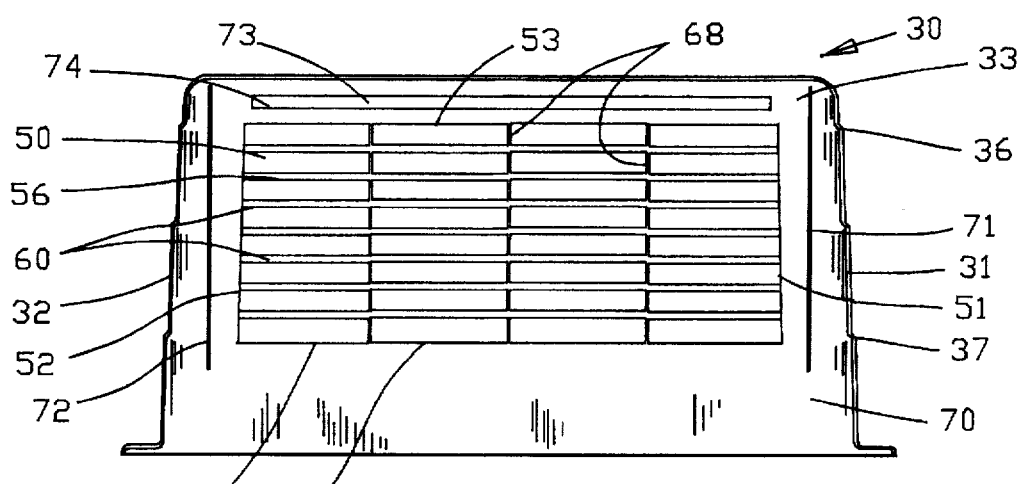
FIG. 7 is an interior view of the air vent cover as seen along line 7—7 in FIG. 5.
Figure 8:
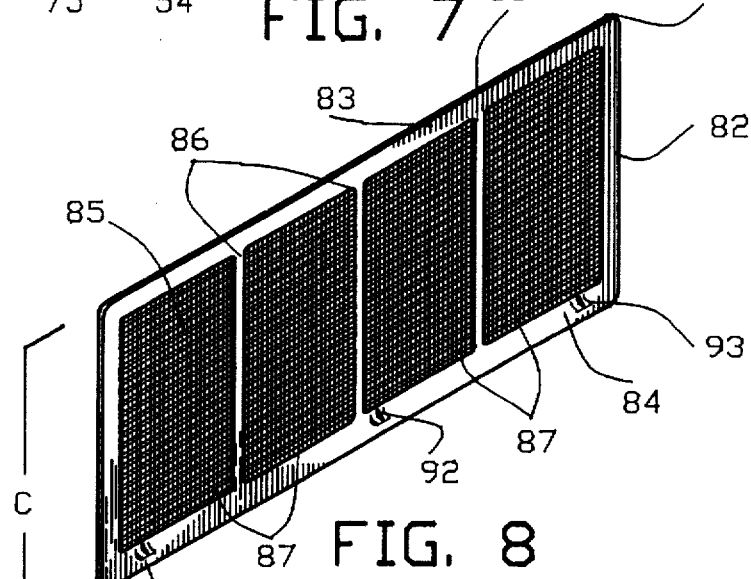
FIG. 8 is an isometric view of a frame with a screen mounted thereon.
Figure 9:
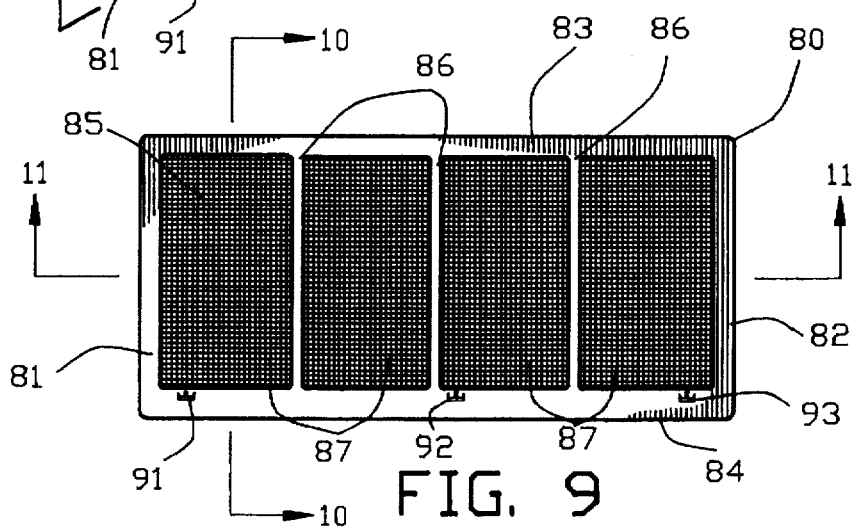
FIG. 9 is a front view of the frame and screen of FIG. 8.

As shown in FIG. 7, a first and a second guide rail 71 and 72 are molded on an interior surface 70 of the rear sidewall 33 and are disposed adjacent the opposed first and second sides 51 and 52 of the cover opening 50. An L-shaped boss 73 is molded on the third side 53 of the cover opening 50 on the interior surface 70 of the rear sidewall 33. The L-shaped boss 73 and the interior surface 70 define a slot 74. The lip 75 is disposed on the fourth side 54 of cover opening 50.

FIGS. 8–11 show a semi-rigid and resilient frame 80 that is preferably molded of polypropylene or other similar material. The frame 80 has a dimension C which is less than a dimension A or a dimension B of the air vent 23 shown in FIGS. 12 and 13. The frame 80 defines a frame window 85 and comprises multiple ribs 86 which cross the frame window 85. A screen 87 is mounted on the frame 80 by screen mounting means 88 such that screen 87 covers the frame window 85. In the preferred embodiment, the screen 87 is integrally molded into the frame 80. Under this method, the screen 87 is placed into a mold (not shown) and the frame 80 is molded about the screen 87. However, screen mounting means 88 may also comprise glue or other conventional screen-mounting techniques such as hook and loop fasteners.

The frame 80 comprises first through fourth sides 81, 82, 83 and 84, respectively. A first through third fastener projections 91–93 are molded into the fourth side 84 of the frame 80. The third fastener projection 93 is positioned slightly off center to avoid striking the vertical rib 68 located at the center of the grill 56.

As shown in FIGS. 12 and 13, the frame 80 is mounted on the interior surface 70 of the rear sidewall 33 for covering the cover opening 50. The sidewall means 31, 32, and 33 and the top surface 34 provide sufficient clearance for the air vent cap 24 to pivot about a hinge 105 to allow a person to extend an arm 99 through the air vent 23 as shown in FIG. 12. The first and second sides 81 and 82 of the frame 80 abut the guide rails 71 and 72 respectively, to prevent lateral movement of the frame 80. The third side 83 of the frame 80 is received within the slot 74. The first, second and third fastener projections 91, 92 and 93 mounted on the fourth side 84 of the frame 80 engage the lip 75 defining the cover opening 50. The slot 74 and the fastener projections 91, 92 and 93 thereby prevent vertical movement of the frame 80 and resiliently retain the frame 80 against the interior surface 70 of the rear sidewall 33.

The operational environment of the air vent cover 30 is shown in FIG. 1, mounted over the air vent 23 on the roof 21 of the vehicle 20. The frame 80 comprising the screen 87 is mounted on the rear sidewall 33 facing the rear end 27 of the vehicle 20. The air vent cover 30 enables wind to pass over the louver blades 60, through the opening 50 and through the screen 87. The wind is directed downwardly by the tapered top surface 34 into the air vent 23 into vehicle 20. The louver blades 60 inhibit large objects from entering the air vent cover 30 as well as protecting the screen 87 from damage. The screen 87 inhibits small objects such as dust, small debris, and insects from entering the air vent cover 30 while enabling filtered air to pass into vehicle 20.

The installation and removal of the frame 80 from the air vent cover 30 is shown in FIGS. 14–18 and may be performed while the air vent cover 30 is secured to the vehicle 20. As represented in FIG. 12, the air vent cover 30 provides sufficient clearance to allow air vent cap 24 to pivot open wide enough to allow a person to reach, as shown by arm 99, through the air vent 23 and to easily remove or install the frame 80 from the cover opening 50. Dimension C of the frame 80 is less than dimension A or dimension B of the vent cover base 23, thus allowing for passage of the frame 80 through the air vent 23.

Figures 14, 15:
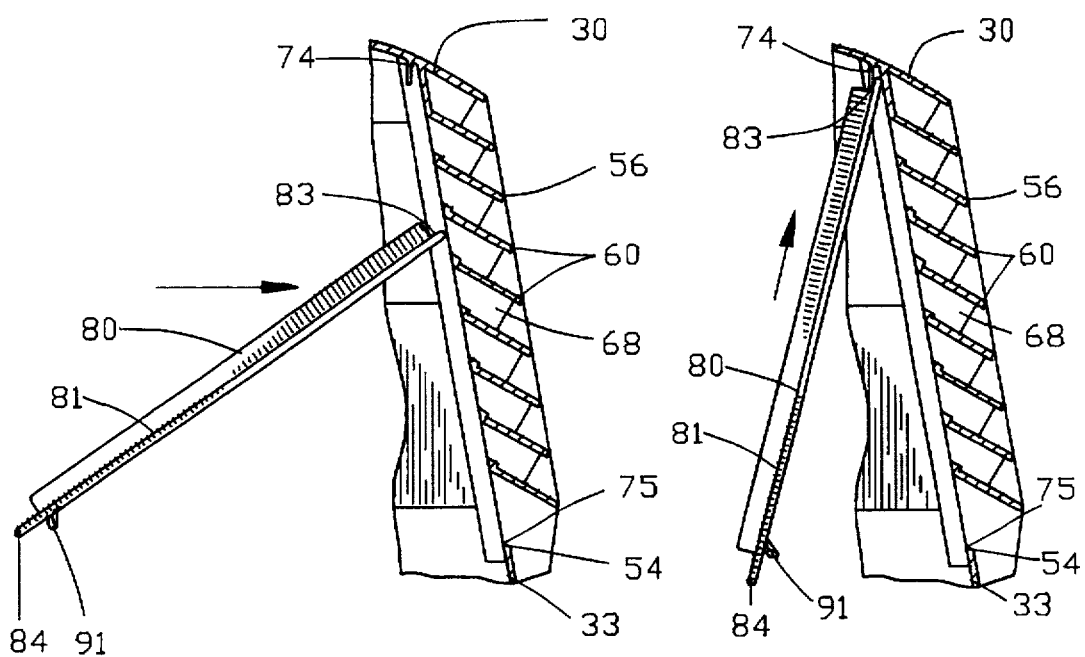
FIG. 14 is an enlarged sectional view of a portion of FIG. 5 illustrating the frame and screen being brought into position between guide rails.
FIG. 15 is a sectional view similar to FIG. 14 illustrating the frame and screen being moved vertically into a slot.

To install the frame 80 on the cover opening 50, the third side 83 of the frame 80 is placed against the interior surface 70 of the rear sidewall 33 between the first and second guide rails 71 and 72 below the slot 74 and above the lip 75 as shown in FIG. 14. The first and second guide rails 71 and 72 prevent lateral movement of the frame 80 relative to the air vent cover 30.

Figures 16, 17, 18:
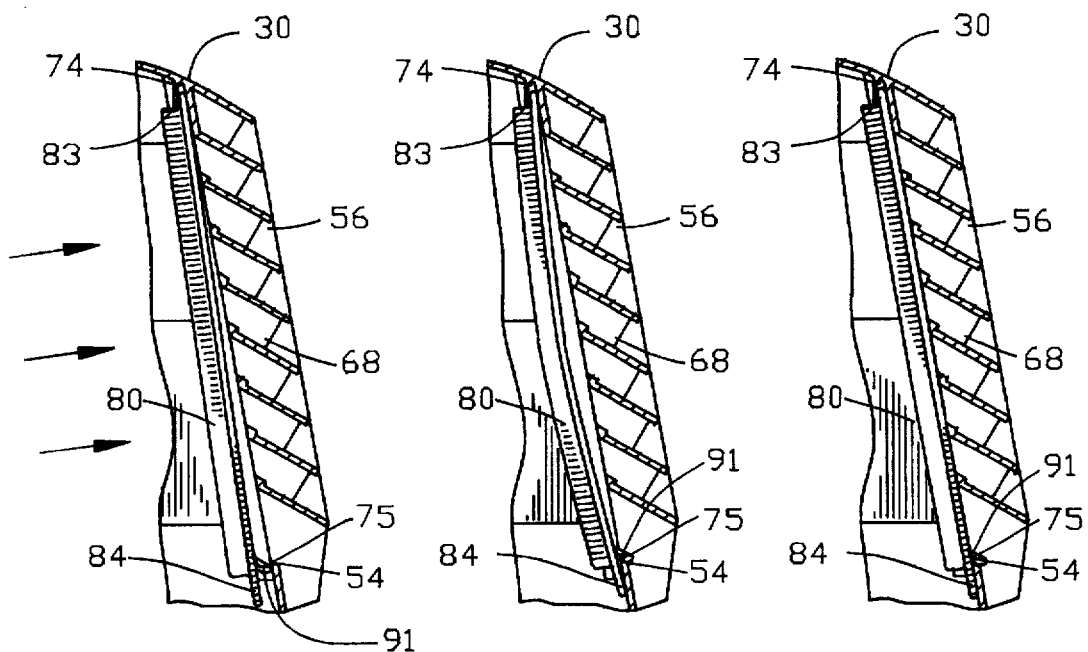
FIG. 16 is a sectional view similar to FIG. 14 illustrating the frame and screen being pivoted about the slot and being brought into position adjacent to a grill.
FIG. 17 is a sectional view similar to FIG. 14 illustrating the frame being deformed to enable the fastener projections to engage a lip of the grill.
FIG. 18 is a sectional view similar to FIG. 14 illustrating the final position of the frame and screen mounted on the air vent cover.
Figure 19:
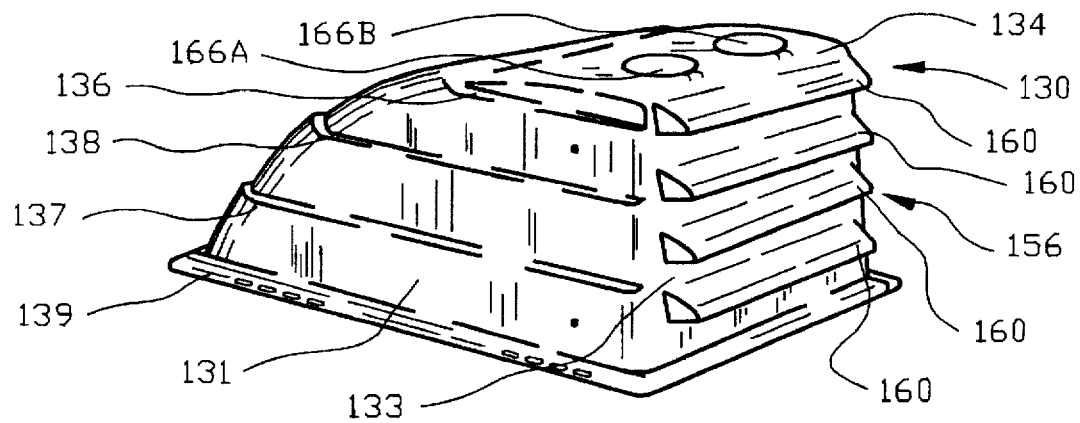
FIG. 19 is an isometric view of a second embodiment of the invention incorporated into a solar operated ventilator cover.

As shown in FIG. 15, the frame 80 is pushed upwards, and the third side 83 of the frame 80 slides upwardly against the interior surface 70 of the rear sidewall 33 until the third side 83 is totally received within the slot 74. Maintaining an upward pressure, the frame 80 is pushed in a forward direction to pivot about the slot 74 until the fastener projections 91, 92 and 93 encounter the lip 75, as shown in FIG. 16. The vertical dimension of the frame 80 between the slot 74 and the fastener projections 91, 92 and 93 exceeds the vertical dimension of the rear sidewall 33 between the slot 74 and the lip 75.

The frame 80 is constructed of a flexible material and may be deformed slightly as shown in FIG. 17 to allow the fastener projections 91, 92 and 93 to resiliently engage the lip 75. In addition, each of the fastener projections 91, 92 and 93 may be deformed to allow each of the fastener projections 91, 92 and 93 to engage the lip 75.

FIG. 18 shows the frame 80 in a mounted position secured against the interior surface 70 of the rear sidewall 33. Lateral movement of the frame 80 is prevented by the guide rails 71 and 72. Vertical movement of the frame 80 is prevented by the slot 74 and the fastener projections 91, 92 and 93 resiliently engaging the lip 75.

Similarly, the frame 80 may be removed by applying a lifting and back pressure against the fourth side 84 of the frame 80 whereby the frame 80 is deformed slightly to release the fastener projections 91, 92 and 93 from engaging the lip 75. The frame 80 can thereby be removed by reversing the procedure described above and shown in FIGS. 14–18.

The air vent cover 30 offers a number of advantages over the covers of the prior art. The air vent cover 30 provides covering and protection for the air vent 23 on the vehicle 20 while enabling the frame 80 and the screen 87 to be removed or installed by a person from inside of the vehicle 20. The frame 80 and the screen 87 can be easily removed and installed by hand without the need for any tools. After the frame 80 and the screen 87 is removed, the screen 87 can be washed in place from internal the vehicle 20.

FIGS. 19–22 are various external views of a second embodiment of the invention incorporated into a solar operated ventilator cover 130. The solar operated ventilator cover 130 comprises a first sidewall 131, a second sidewall 132, and a rear sidewall 133 which provide support for a top surface 134. Preferably, the solar operated ventilator cover 130 is constructed of plastic or other weather resistant material. The first and second sidewalls 131 and 132 are substantially vertical relative to a roof such as roof 21 in FIG. 1. The rear sidewall 133 is angled toward the rear end 27. The top surface 134 is tapered from the rear sidewall 133 to a leading edge 135 of solar operated ventilator cover 130. A top and a bottom horizontal ridge 136 and 137 run horizontally about the solar operated ventilator cover 130 for added structural strength. An intermediate ridge 138 further increases structural strength. The solar operated ventilator cover 130 is affixed to the roof 21 by means shown as a base projection 139 having holes 141 and 142.

Similar to the mounting shown in FIG. 1, the solar operated ventilator cover 130 is mounted relative to the vehicle 20 such that the rear sidewall 133 is aligned toward the rear end 27 of the vehicle 20, and the leading edge 135 of the solar operated ventilator cover 130 is aligned toward the front end 26 of the vehicle 20. Conventional bolts (not shown) are inserted through the holes 141 and 142 in the base projection 139 to secure the solar operated ventilator cover 130 to the roof 21 of the vehicle 20.

Figure 20:
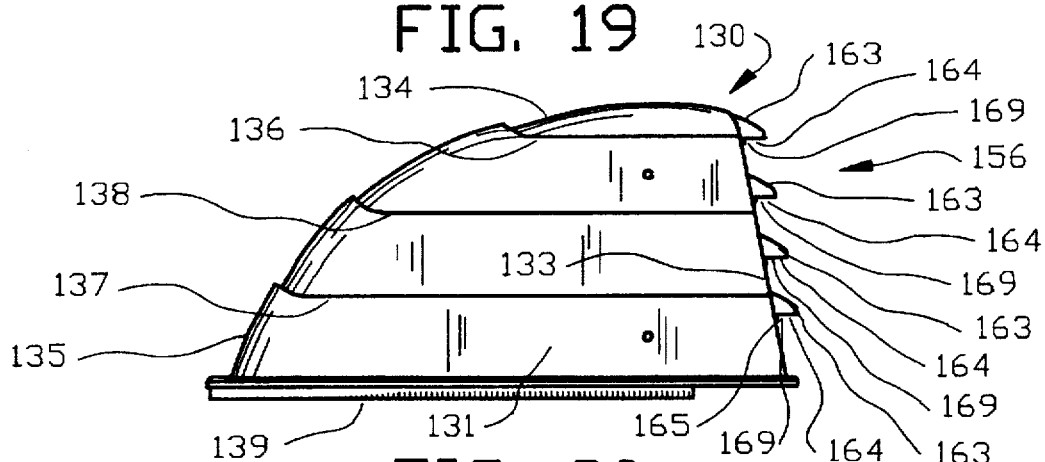
FIG. 20 is a side view of the solar operated ventilator cover of FIG. 19.

The rear sidewall 133 includes a grill shown generally as 156 having a plurality of lower protrusions 160. As best shown in FIG. 20, each lower protusion 160 has a sloping louver surface 163 and a horizontal louver surface 164. Each sloping louver surface 163 slopes downward at an acute angle from the horizontal. The horizontal louver surface 164 is substantially parallel to the horizontal plane and is closer to the roof 21 than the sloping louver surface 163. Each of the horizontal louver surface 164 defines a grill opening 169. A water stop 165 is molded on the horizontal louver surface 164 of each of the louver protrusions 160 between the grill opening 169 and the rear sidewall 133.

Wind-driven precipitation will contact and adhere to the sloping louver surface 163 of the louver protusion 160 and will be driven back and upwardly along the sloping louver surface 163 of the louver protusion 160 toward rear sidewall 133. The precipitation is inhibited from entering grill opening 169 by the water stop 165. Rain is thereby inhibited from entering the interior of the solar operated ventilator cover 130 or into the vehicle 20.

Figure 21:
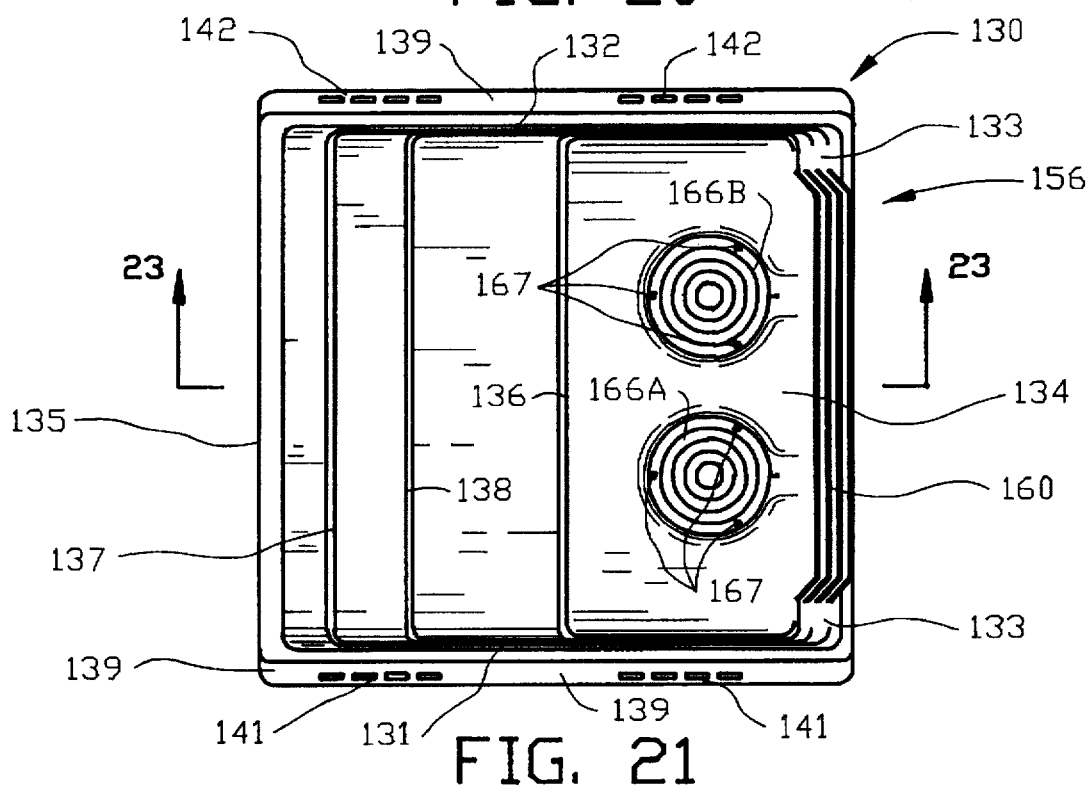
FIG. 21 is a top view of FIG. 20.
Figure 22:
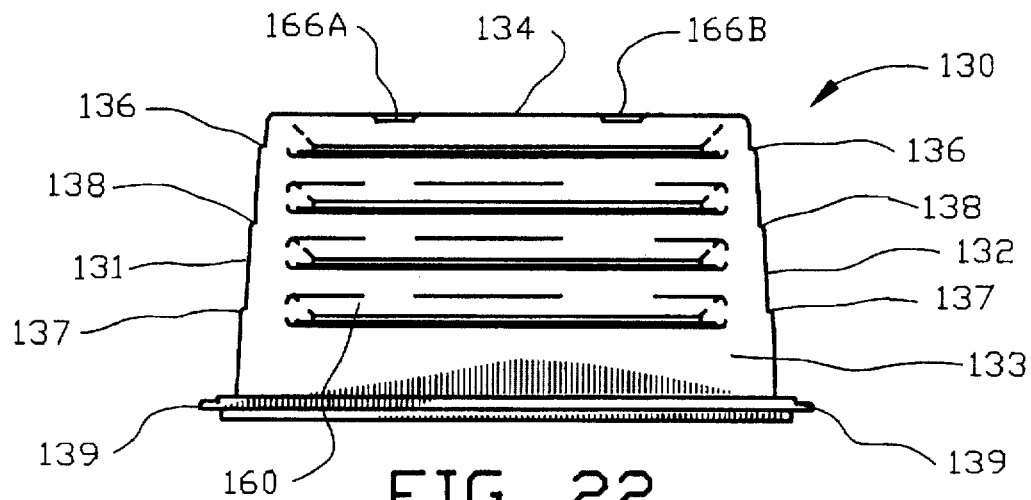
FIG. 22 is a front view of FIG. 20.

As best shown in FIG. 21, a first and a second photovoltaic cells 166A and 166B is mounted on the top surface 134 and being secured thereto by screws 167. Glue or other fastening means may alternatively be used to secure the first and second photovoltaic cells 166A and 166B on the top surface 134. Preferably, each of the photovoltaic cell 166A and 166B is mounted on substantially the most horizontal portion of the top surface 134 to allow for maximum capture of solar radiation.

FIGS. 23–29 are various internal views of a solar operated ventilator cover 130 illustrating an internal wall 190 mounted internal the solar operated ventilator cover 130. The internal wall 190 is mounted substantially perpendicular to and abutting a first side wall 131, a second sidewall 132 and a top surface 134. The internal wall 190 defines a first chamber and a second chamber 191A and 191B within the solar operated ventilator cover 130 with the first chamber 191A being disposed adjacent a grill 156. The internal wall 190 is secured to the first sidewall 131, the second sidewall 132 and the top surface 134 by wall fastener means shown as metallic fasteners 192, or the like or other suitable means. The internal wall 190 forms a seal 193 with the first and second sidewalls 131 and 132 and the top surface 134.

Figure 24:
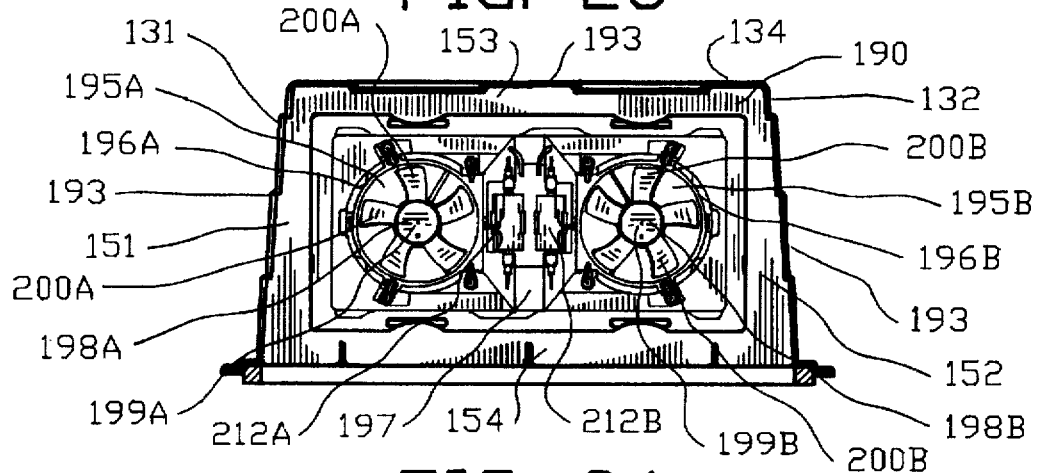
FIG. 24 is a sectional view along line 24—24 in FIG. 23.

The internal wall 190 comprises a first and a second internal wall surface 194A and 194B adjacent to the first and second chambers 191A and 191B respectively. As best shown in FIG. 24, the second internal wall surface 194B has a first, second, third and fourth side 151–154 respectively.

A first and a second orifice 195A and 195B is defined in the internal wall 190. A first and a second cylindrical tunnel 196A and 196B extend a first axial length E from the first and second orifices 195A and 195B between the first and second chambers 191A and 191B, respectively. The internal wall 190 also defines an electrical housing 197 between the first and second cylindrical tunnels 196A and 196B.

A first and a second electric motor 198A and 198B having a first and a second motor shaft 199A and 199B with a first and a second fan blade 200A and 200B secured thereto. The first and second electric motors 198A and 198B are mounted in a first and a second motor housing 201A and 201B, respectively.

As shown in greater detail in FIGS. 26–29, housing guides 202 are integrally molded on the first and second motor housings 201A–201B. The first and second cylindrical tunnels 196A–196B define guide grooves 203 designed to receive the housing guides 202 upon insertion of the first and second motor housings 201A–201B into the first and second cylindrical tunnels 196A–196B. The first and second motor housings 201A–201B are removably mounted to the internal wall 190 within the first and second cylindrical tunnels 196A–196B by insertion of the first and second motor housings 201A–201B from the second chamber 191B into the first and second cylindrical tunnels 196A–196B. Upon insertion of the first and second motor housings 201A–201B into the first and second cylindrical tunnels 196A–196B, the housing guides 202 are received by the guide grooves 203. The housing guides 202 and the guide grooves 203 position and align the first and second electric motors 198A–198B and the first and second fan blades 200A–200B within the first and second cylindrical tunnels 196A–196B proximate the first and second orifice 195A–195B. Once inserted, the first and second motors housings 201A–201B are secured to the internal wall 190 by motor fastening means shown as manually operated rotatable latches 204.

The first and second electric motors 198A–198B and the first and second fan blades 200A–200B each define a second axial length F. The first axial length E of the first and second cylindrical tunnels 196A–196B is commensurate with the second axial length F of the first and second electric motors 198A–198B enabling the first and second electric motor 198A–198B and the first and second fan blades 200A–200B to be located within the first and second cylindrical tunnels 196A–196B.

Electrical connecting means shown as wires 210 and connectors 211 electrically connect the first and second photovoltaic cells 166A–166B to the first and second electric motors 198A–198B and a first and a second rechargeable battery 212A–212B. Each of the first and second rechargeable batteries 212A–212B is connected in electrical parallel with one of the first and second photovoltaic cells 166A–166B, as more fully described below. The wires 210 are passed through holes 214 in top surface 134 of the solar operated ventilator cover 130. The wires 210 and the connectors 211 are housed in the electrical housing 197. The first and second rechargeable batteries 212A–212B are mounted on the second internal wall surface 194B within the electrical housing 197.

Figure 30:
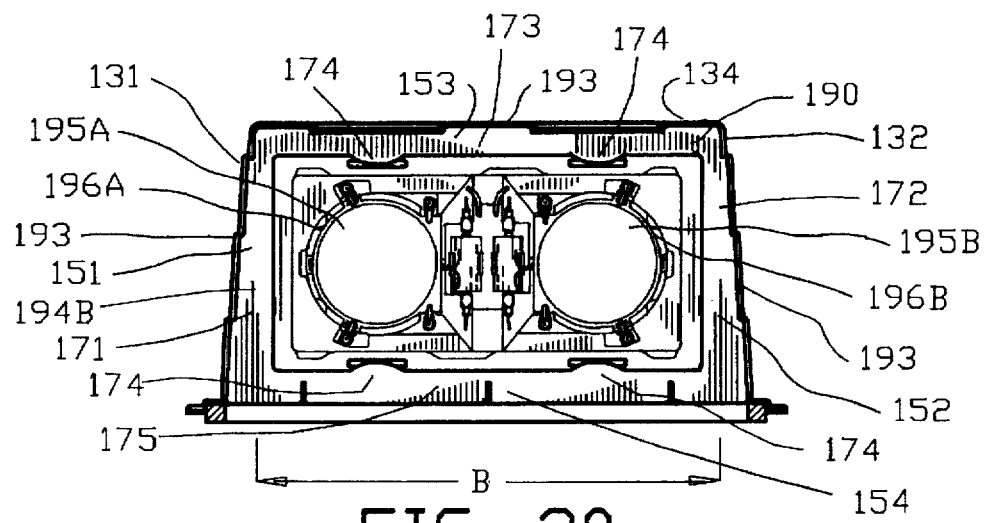
FIG. 30 is an internal view similar to FIG. 25 with the electric motor being removed and without a frame and a screen.

As shown in FIG. 30, a respite 220 is defined in second internal wall surface 194B of the internal wall 190. The respite 220 comprises a first and a second side respite guide 171 and 172, and a top and a bottom respite guide 173 and 175, molded on the second internal wall surface 194B of the internal wall 190. The first and second side respite guides 171 and 172 are disposed adjacent the opposed first and second sides 151 and 152 of the second internal wall surface 194B. The top and bottom respite guides 173 and 175 are disposed on the opposed third and fourth sides 153 and 154 of the second internal wall surface 194B. A plurality of fastener projections 174 are formed adjacent to the top and bottom respite guides 173 and 175 as well as being formed in the third and fourth sides 153 and 154 of the second internal wall surface 194B. The fastener projections 174 extend inwardly into the respite 220 for retaining a frame 180 within the respite 220.

Figure 31:
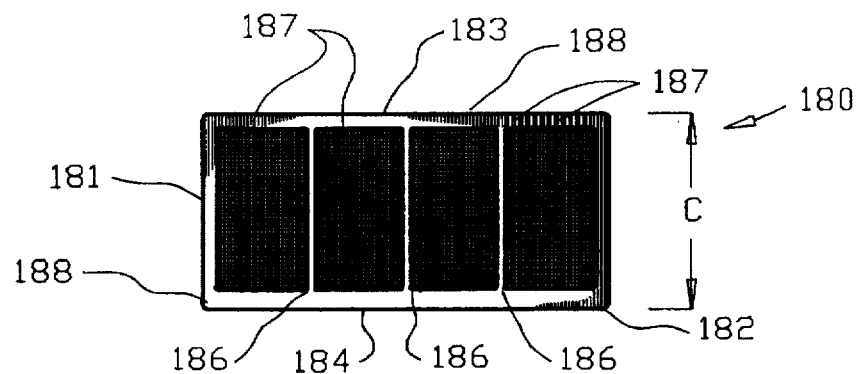
FIG. 31 is an elevational view of the frame and screen for insertion in the solar operated ventilator cover.

FIG. 31 shows the semi-rigid and resilient frame 180 which is substantially equivalent to the frame 80 described above and depicted in FIGS. 8–11. The frame 180 has a dimension C which is less than a dimension A or a dimension B of the aperture 23 shown in FIGS. 30 and 32. The frame 180 comprises a first through fourth side 181, 182, 183 and 184, respectively. The frame 180 defines a frame window 185 with multiple ribs 186 crossing the frame window 185. A screen 187 is mounted on the frame 180 by screen mounting means 188 such that screen 187 covers the frame window 185. In the preferred embodiment, the screen 187 is integrally molded into the frame 180. However, the screen mounting means 188 may also comprise glue or other conventional screen-mounting techniques such as hook and loop fasteners.

Figure 36:
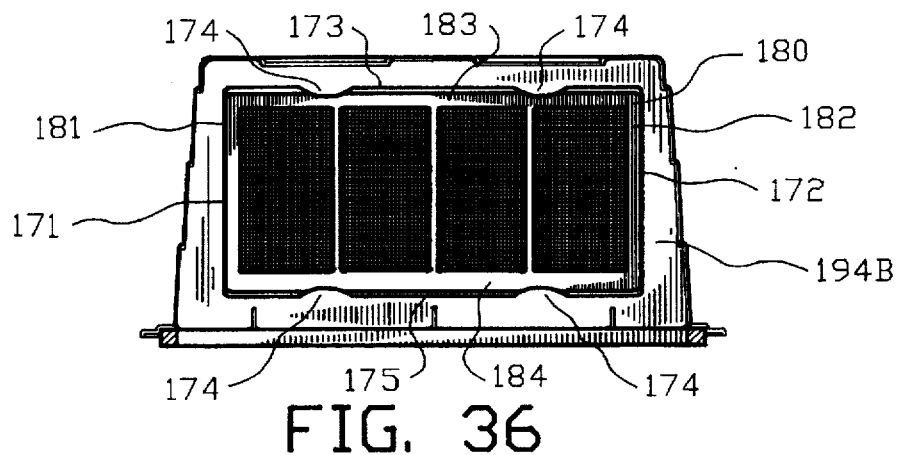
FIG. 36 is a view similar to FIG. 30 illustrating the final position of the frame and screen mounted in the solar operated ventilator cover.

As shown in FIGS. 32–36 and described hereinafter, the frame 180 is mounted within the respite 220 of the second internal wall surface 194B for covering the first and second orifices 195A–195B. As best shown in FIG. 36, the first and second sides 181 and 182 of the frame 180 abut the first and second respite guides 171 and 172 respectively, preventing lateral movement of the frame 180. The third and fourth sides 183 and 184 of the frame 180 abut the top and bottom respite guides 173 and 174, respectively, preventing vertical movement of the frame 180. The fastener projections 174 receive the third side 183 and the fourth side 184 of the frame 180 to resiliently retaining the frame 180 against the respite 220 of the second internal wall surface 194B of the interior wall 190.

Figure 32:
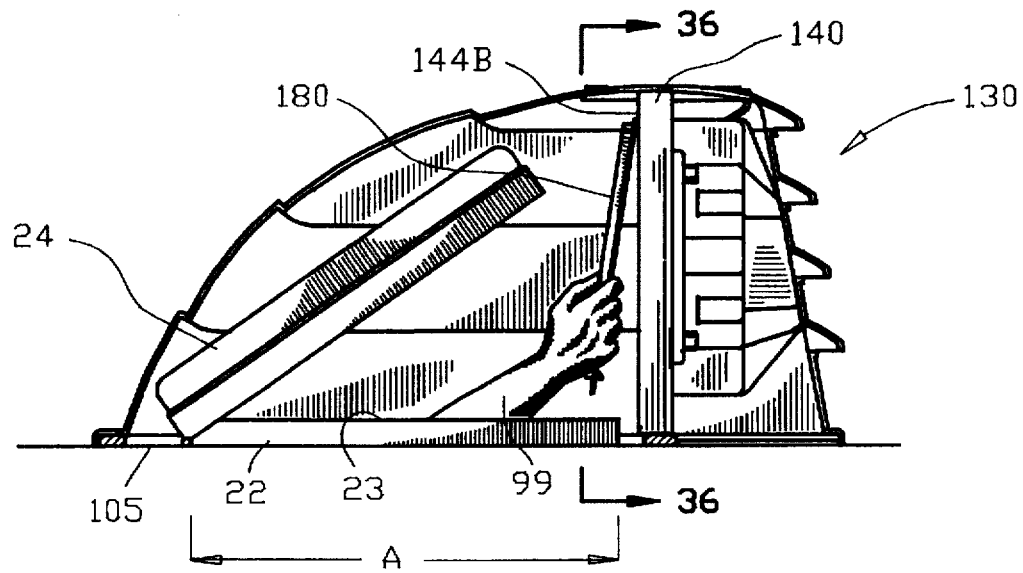
FIG. 32 is a sectional view similar to FIG. 23 with the solar operated ventilator cover mounted on the horizontal surface illustrating the insertion of the frame and the screen therein.

The installation of the frame 180 and screen 187 onto the solar operated ventilator cover 130 is shown in FIGS. 32–36. As shown in FIG. 32, the solar operated ventilator cover 130 provides sufficient clearance to allow the air vent cap 24 to pivot open wide enough to allow a person to reach, as shown by arm 99, through the aperture 23 and to easily install or remove the frame 180 from the internal wall 190. Dimension C of the frame 180 is less than dimension A or dimension B of the skylight 22, thus allowing for passage of the frame 180 through the aperture 23.

Figures 33, 34, 35:
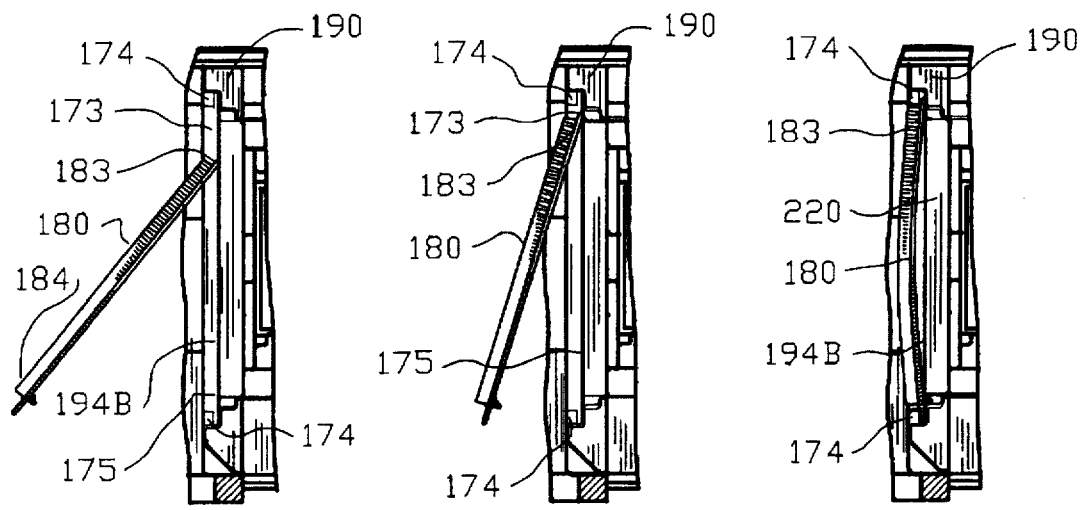
FIG. 33 is a sectional view illustrating the frame and screen being inserted between upper projections and a respite.
FIG. 34 is a sectional view similar to FIG. 33 illustrating the frame being deformed to enable the screen to be inserted between lower projections and the respite.
FIG. 35 is a sectional view similar to FIG. 34 illustrating the final position of the frame and screen mounted in the solar operated ventilator cover.

As shown in FIG. 33, the third side 183 of the frame 180 is placed against the first and second respite guides 171 and 172 of the second internal wall surface 194B below the top respite guide 173 and above the bottom respite guide 175. The first and second respite guides 171 and 172 prevent lateral movement of the frame 180 relative to the internal wall 190.

As shown in FIG. 34, the frame 180 is pushed upwards, and the third side 183 of the frame 180 slides upwardly against the second internal wall surface 194B of the internal wall 190 until the third side 183 is totally received within the fastener projections 174. Maintaining an upward pressure, the frame 180 is pushed in a forward direction to pivot about the fastener projections 174 until the fourth side 184 of the frame 180 encounters the fastener projections 174 on the lower respite guide 175. The vertical dimension of the frame 180 between the third side 183 and the fourth side 184 exceeds the vertical dimension of the respite between the fastener projections 174 on the top respite guide 173 and the fastener projections 174 on the lower respite guide 175. The frame 180 is constructed of a flexible material and may be deformed slightly to allow the frame to resiliently engage the fastener projections 174.

FIGS. 35 and 36 show the frame 180 in a mounted position secured against the respite 220 of the second internal wall surface 194B. Lateral movement of the frame 180 is prevented by the first and second respite guides 171 and 172. Vertical movement of the frame 180 is prevented by the fastener projections 174 holding the third and fourth respite guides 173 and 175. The frame 180 in thus held securely against the second internal wall surface 194B overlying the first and second orifices 195A–195B.

Similarly, the frame 180 may be removed by applying a lifting and back pressure against the fourth side 184 of the frame 180 whereby the frame 180 is deformed slightly to release the fourth side 184 of the frame from engagement with the fastener projections 174 of the lower respite guide 175. The frame 180 can thereby be removed by reversing the procedure described above and shown in FIGS. 33–35.

Figure 37:
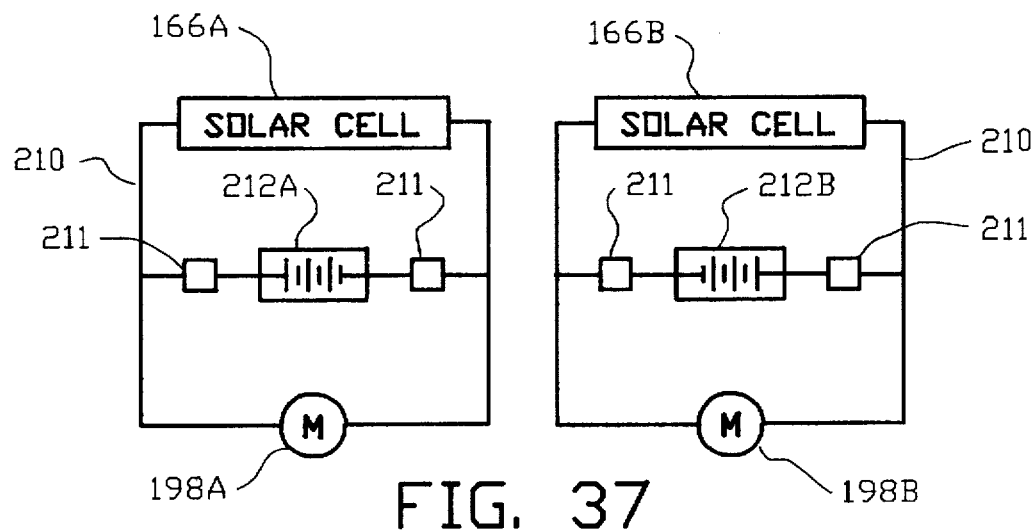
FIG. 37 is a schematic electrical diagram of a first electrical circuit for use in the solar operated ventilator cover.

FIG. 37 illustrates a first electrical diagram of each of the two electrical circuits of the solar operated ventilator cover 130. The first photovoltaic cell 166A is connected in electrical parallel with the first battery 212A and with the first electric motor 198A. The first photovoltaic cell 166A is intrinsically a diode and accordingly inhibits discharge of the first battery 212A through the first photovoltaic cell 166A. The second photovoltaic cell 166B is similarly configured with the second battery 212B and the second electric motor 198B.

Figure 23:
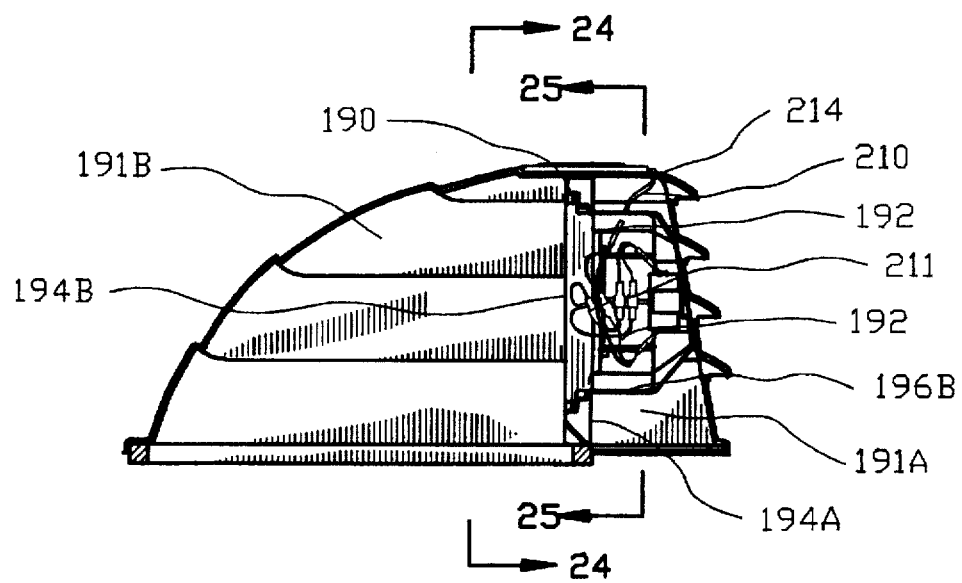
FIG. 23 is a sectional view along line 23—23 in FIG. 21.

FIG. 38 is a sectional view similar to FIG. 23 with the solar operated ventilator cover 130 mounted on the horizontal surface 21 illustrating a disconnect switch 213A mounted on a vent cap 24 with the vent cap 24 being in a closed position. FIG. 38A is a schematic electrical diagram of a second electrical circuit in the solar operated ventilator cover 130 when the vent cap 24 is in the closed position as shown in FIG. 38.

FIG. 39 is a sectional view similar to FIG. 38 with the vent cap 24 being in an open position. FIG. 39A is a schematic electrical diagram of the second electrical circuit in the solar operated ventilator cover 130 when the vent cap 24 is in the open position as shown in FIG. 39. The disconnect switch 213A is connected electrically in series with the first and second electric motors 198A and 198B.

The operational environment of the solar operated ventilator cover 130 is similar to that of air vent cover 30 described previously and shown in FIG. 1. The solar operated ventilator cover 130 is mounted over the aperture 23 on the roof 21 of the vehicle 20. The frame 180 comprising the screen 187 is mounted on the second internal wall surface 194B. The solar operated ventilator cover 130 enables air to pass from the vehicle 20 through the aperture 23 through the screen 187 and the grill openings 169 to be discharged from the grill 156. The louver protrusions 160 inhibit large objects from entering the solar operated ventilator cover 130 as well as protecting the screen 187 from damage. The screen 187 inhibits small objects such as dust, small debris, and insects from entering the solar operated ventilator cover 130 while enabling air to pass unrestricted from the vehicle 20.

FIG. 37 depicts the operation of the first electric circuit of the solar operated ventilator cover 130. When solar irradiation impinges upon the first and second photovoltaic cells 166A–166B, the first and second photovoltaic cells 166A–166B generates electrical energy. The electrical energy is conveyed through the wires 210 to the first and second rechargeable batteries 212A–212B and the first and second electric motors 198A–198B. The first and second electric motors 212A–212B rotate to drive the first and second fan blades 200A–200B. The placement of the first and second fan blades 200A–200B within first and second cylindrical tunnels 196A–196B provides a flow of air 221 within first and second cylindrical tunnels 196A–196B between first chamber 191A and second chamber 191B of the solar operated ventilator cover 130. The seal formed between vent cover 130 and horizontal surface 21 directs the flow of air 221 between the interior and exterior of the vehicle 20. Air is drawn from within the vehicle 20 through the aperture 23 into the second chamber 191B. The air is then drawn through the first and second cylindrical tunnels 196A–196B past the first and second fan blades 200A–200B and into first chamber 191A to exit through the grill openings 169. Concomitantly therewith, the first and second photovoltaic cells 166A–166B convey electrical energy to charge the first and second rechargeable batteries 212A–212B.

The electrically parallel configuration shown in FIG. 37 enables the first and second photovoltaic batteries 166A–166B to power the first and second electric motors 198A–198B and to simultaneously and independently charge the first and second rechargeable batteries 212A–212B during impingement of solar irradiation upon the first and second photovoltaic cells 166A–166B. The configuration further allows the first and second electric motors 198A–198B to be independently driven by the first and second rechargeable batteries 212A–212B when no solar irradiation is present.

As shown in FIGS. 38 and 38A, the disconnect switch 213A automatically opens the circuit to inhibit operation of the first and second electric motors 198A–198B, respectively, when the air vent cap 24 is closed as shown in FIG. 38. The automatic opening of the circuit to prevent the first and second electric motors from being powered when air vent cap 24 is in the closed position. However, the placement of the disconnect switch 213A allows the continued charging of the first and second rechargeable batteries 212A–212B when air vent cap 24 is in the closed position.

As shown in FIGS. 39 and 39A, the disconnect switch 213A automatically close the circuit to power the first and second electric motors 198A–198B, respectively, when the air vent cap 24 is in an open position as shown in FIG. 39. The placement of the disconnect switch 213A allows the continued charging of the first and second rechargeable batteries 212A–212B when air vent cap 24 is in the open position. This arrangement prevents unnecessary operation of first and second electric motors 198A–198B, thus increasing efficiency and prolonging life of the components. In addition, the charging of the first and second rechargeable batteries 212A–212B is enhanced when air vent cap 24 is in the closed position as shown in FIGS. 38 and 38A.

The solar operated ventilator cover 130 offers a number of advantages over the covers of the prior art. The solar operated ventilator cover 130 enables the frame 180 and the screen 187 to be removed or installed by hand without the need for any tools, and by a person from inside of the vehicle 20. The solar operated ventilator cover 130 utilizes an internal wall 190 to increase efficiency while maintaining simplicity by utilizing a one-piece assembly. The motor driven fans 200A–200B are incorporated for ventilating the vehicle 20. The two fan blades 200A–200B allow for high volumetric air flow within limited height restrictions of solar operated ventilator cover 130, thus increasing efficiency. The fans 200A–200B are operated independently of the electrical system of the vehicle 20 and can operate continuously without draining the battery of the vehicle 20. Further the fans 200A–200B can operate in the absence of solar irradiation, such as during precipitation from the first and second rechargeable batteries 212A–212B. The electric motors 198A–198B are installed on the vehicle 20 with no electrical installation required. The electric motors 198A–198B are removably mounted, and can thus be easily and cheaply replaced. The electric motors 198A–198B operate the fan blades 200A–200B only when air vent cap 24 is open.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved solar operated ventilator cover for covering an aperture disposed in a horizontal surface with an air vent cap pivotably mounted relative to the horizontal surface between an opened position to allow air flow through the aperture and a closed position for inhibiting air flow through the aperture, the cover having sidewall means and a top surface with a cover opening defined within the sidewall means, and means for affixing the cover to the horizontal surface;

the improvement comprising:

an internal wall extending between the sidewall means and the top surface for defining a first chamber and a second chamber with said first chamber being disposed adjacent the cover opening;

an orifice defined in said internal wall for enabling the flow of air between said first and said second chambers;

an electric motor having a motor shaft with a fan blade secured thereto;

means for securing said electric motor relative to said orifice for positioning said fan blade proximate said orifice;

a rechargeable battery disposed within the cover;

a photovoltaic cell secured to the top surface of the cover for converting solar irradiation into electrical power;

electrical connecting means connecting said photovoltaic cell to said rechargeable battery for enabling said photovoltaic cell to charge said rechargeable battery during impingement of solar irradiation upon said photovoltaic cell;

a disconnect switch connecting said rechargeable battery to said electric motor;

said disconnect switch mounted on the air vent cap for movement with the air vent cap between the open position and closed position;

said disconnect switch automatically closing for connecting said rechargeable battery to said electric motor when the air vent cap is pivoted into the opened position to provide an air flow through the aperture; and said disconnect switch automatically opening for disconnecting said rechargeable battery from said electric motor when the air vent cap is pivoted into the closed position when the aperture is obstructed by the air vent cap.

2. An improved solar operated ventilator cover as set forth in claim 1, including wall fastener means for securing said internal wall to the sidewall means.

3. An improved solar operated ventilator cover as set forth in claim 1, wherein said internal wall includes a cylindrical tunnel extending from said orifice; and said electric motor and said fan blade being located within said cylindrical tunnel.

4. An improved solar operated ventilator cover as set forth in claim 1, wherein said internal wall includes a cylindrical tunnel extending from said orifice; and said electric motor and said fan blade being removably secured within said cylindrical tunnel.

5. An improved solar operated ventilator cover as set forth in claim 1, wherein said internal wall includes a cylindrical tunnel extending a first axial length from said orifice;

said electric motor and said fan blade defining a second axial length; and said first axial length being commensurate with said second axial length for enabling said electric motor and said fan blade to be located within said cylindrical tunnel.

6. An improved solar operated ventilator cover as set forth in claim 1, wherein said orifice includes a first and a second orifice;

said internal wall including a first and a second cylindrical tunnel extending from said first and second orifice; and said electric motor and said fan blade comprising a first and a second electric motor and fan blade located within said first and second cylindrical tunnels, respectively.

7. An improved solar operated ventilator cover as set forth in claim 1, wherein said orifice includes a first and a second orifice;

said internal wall including a first and a second cylindrical tunnel extending from said first and second orifice;

said electric motor and said fan blade comprising a first and a second electric motor and fan blade located within said first and second cylindrical tunnels, respectively; and said internal wall including housing defined between said first and second cylindrical tunnels for receiving said electrical connecting means.

* * * * *